Patented Nov. 1, 1927.

1,647,162

UNITED STATES PATENT OFFICE.

HENRY WENKER, OF HAMBURG, NEW YORK, ASSIGNOR TO NATIONAL ANILINE AND CHEMICAL CO., INC., OF NEW YORK, N. Y., A CORPORATION OF NEW YORK.

DYE COMPOSITION CONTAINING SOLUBLE-COTTON YELLOW G.

No Drawing. Application filed November 6, 1925. Serial No. 67,433.

This invention relates to the production of a dye composition which is readily soluble in water, and which contains diphenylurea-p.p'disazo-bis-salicylic acid.

Diphenylurea-p.p'-disazo-bis-salicylic acid corresponds to the following formula:

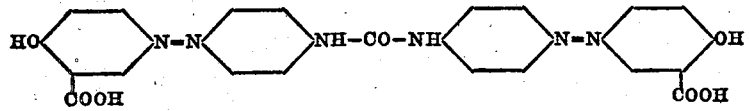

It is practically insoluble in water and appears to exist in two forms,—one having a geenish-yellow color and the other a dark or almost black color. The light-colored form can be prepared by the slow acidification of hot aqueous solutions of soluble salts of the acid and the dark colored form by quick or rapid acidification, particularly of cold (room temperature) solutions.

The disodium salt of diphenylurea-p.p'-disazo-bis-salicylic acid is commercially known as cotton yellow G, and is usually prepared, for example, by treating 4-hydroxy-3-carboxy-4'-aminoazo-benzene with phosgene in the presence of an alkaline medium. The sodium salt as usually prepared, particularly after being dried, does not readily redissolve in water and presents considerable difficulties in the preparation of clear solutions for dye-bath use.

I have found that when the dye in the form of the acid, preferably the light colored form, is mixed, preferably in the dry state, with suitable alkaline compounds that the dry or dried mixture is capable of dissolving in water to give a clear solution. Apparently the sodium salt when formed in the nascent state is soluble in water whereas the same salt after being dried does not readily redissolve; but the present invention is not limited to any explanation or reason why a dry mixture of the acid with alkaline substances is readily soluble. Any alkaline substance capable of giving a soluble salt with the acid may be used in forming the dye composition of the present invention. Preferably, however, the alkaline substance should not be deliquescent in character and the alkali metal carbonates, and particularly alkali metal phosphates, especially disodium hydrogen phosphate, are particularly suitable. The alkali metal phosphates are sufficiently alkaline to be satisfactorily used and do not tend to absorb undue amounts of moisture or to cause foaming as do the carbonates. It should be understood, however, that in its broader aspects the invention is not limited to the use of any particular substance but covers any alkaline substance capable of yielding soluble salts with the free acid of cotton yellow G.

The dry composition product according to the present invention may contain the free acid corresponding to cotton yellow G, that is, diphenylurea-p.p'-disazo-bis-salicylic acid, and the alkaline substance alone or it may advantageously contain other salts such as sodium sulfate which are commonly used in the preparation of dye baths. Dispersing agents such as glucose, dextrin or the like may also be used in conjunction with the dye composition of the present invention if their presence in the dye bath is desirable. The dye composition may also be used in conjunction with other dyes, if desired.

The invention will be further illustrated by the following specific examples, but it will be understood that the invention is not limited thereto. The parts are by weight.

*Example 1.*—20 parts of the light-colored and dry free acid of cotton yellow G, 50 parts of disodium hydrogen phosphate and 30 parts of sodium sulfate are ground together until they pass through a sieve of about 60 to 150 meshes to the linear inch. The resulting powder is capable of ready solution in water to form a clear bath of a concentration suitable for dyeing. Instead of grinding the materials together they may be ground separately and mixed as a powder. Instead of sodium sulfate a corresponding amount of sodium chloride may be used.

In this example, the sodium sulfate may be omitted. Further, the acid as a wet paste may be mixed with the alkaline substance and the mixture evaporated to dryness while stirring or being ground together.

*Example 2.*—20 parts of cotton yellow G in the form of the free acid, 50 parts disodium hydrogen phosphate and 30 parts of sodium chloride free from calcium oxide are ground together until the product passes through a sieve of about 90 to 150 mesh. The product is readily soluble in water to form a clear solution of the requisite concentration for dye baths. Instead of using sodium chloride alone a mixture of sodium chloride free from calcium oxide and sodium sulfate may be used.

*Example 3.*—20 parts of the free acid corresponding to cotton yellow G, 5 parts calcined soda ash, and 60 parts of sodium sulfate are ground together until the product passes through a sieve having about a 100 to 150 mesh. The product is readily soluble in water to a clear solution of a concentration adequate for dye baths but tends to foam somewhat on solution due to evolution of carbon dioxide.

Although the light-colored and the dark-colored form of the free acid are each capable of yielding soluble compositons according to the present invention, the light-colored form is preferably employed since it has a more desirable color and need not be ground to such a fine condition, and when admixed or in admixture with alkaline substances tends to dissolve more easily to give clear solutions than does the dark or black form.

I claim:

1. A dye composition comprising the free acid of cotton yellow G and an alkaline substance which forms a soluble salt therewith, the composition in the dry state being characterized by ready solubility in water to form a clear solution of a concentration suitable for dye bath use.

2. A dye composition comprising a dry powder containing the acid corresponding to cotton yellow G, an alkaline substance which forms soluble salts with the acid, and a calcium oxide free neutral alkali-metal salt, said composition being characterized by ready solubility in water to form a clear solution of a concentration adequate for dye bath use.

3. A dry dye composition as a powder comprising the free acid corresponding to cotton yellow G mixed with sufficient alkaline substance capable of forming a soluble salt therewith, and a calcium oxide free neutral alkali-metal salt, said composition being characterized by ready solubility in water to form a clear solution of a concentration adequate for dye bath use.

4. A dry dye composition comprising the acid corresponding to cotton yellow G and an alkaline alkali-metal compound, said composition being characterized by ready solubility in water to form a clear solution of a concentration suitable for dye bath use.

5. A dry dye composition comprising the free acid corresponding to cotton yellow G and sufficient alkaline alkali-metal compound to form the dye salt, said composition being characterized by ready solubility in water to form a clear solution of a concentration suitable for dye bath use.

6. A dry composition in powder form comprising the free acid corresponding to cotton yellow G, sufficient alkaline alkali-metal compound to form the dye salt, and a calcium oxide free neutral alkali-metal salt, said composition being characterized by ready solubility in water to form a clear solution in strength suitable for dye bath use.

7. A dry dye composition comprising the free acid corresponding to cotton yellow G and an alkaline alkali-metal phosphate, said composition being characterized by ready solubility in water to form a clear solution in strength suitable for dye bath use.

8. A dry dye composition comprising the free acid corresponding to cotton yellow G and sufficient alkaline alkali-metal phosphate to form the dye salt, said composition being characterized by ready solubility in water to form clear solution of a concentration suitable for dye bath use.

9. A dry dye composition in powder form comprising the free acid corresponding to cotton yellow G and sufficient alkaline alkali-metal phosphate to form the dye salt, and a calcicum oxide free neutral alkali-metal salt, said composition being characterized by ready solubility in water to form clear solution in concentration suitable for dye bath use.

10. A dry dye composition comprising the free acid corresponding to cotton yellow G and disodium phosphate, said composition being characterized by ready solubility in water to form clear solution in concentration suitable for dye bath use.

11. A dry dye composition comprising the free acid corresponding to cotton yellow G and sufficient disodium phosphate to form the disodium salt of said acid, said composition being characterized by ready solubility in water to form clear solutions in concentration suitable for dye bath use.

12. A dry dye composition in powder form comprising the free acid corresponding to cotton yellow G, sufficient disodium phosphate to form the disodium salt of said acid, and a calcium oxide free neutral alkali-metal salt, said composition being characterized by ready solubility in water to form clear solutions in concentration suitable for dye bath use.

13. A dry dye composition in powder form comprising the free acid corresponding to cotton yellow G, disodium phosphate and a neutral alkali-metal salt in the proportion of 20 parts of the free acid, 50 parts of disodium phosphate, and 30 parts of the neutral alkali-metal salt, said composition being characterized by ready solubility in water to form clear solutions in concentration suitable for dye bath use.

14. A dry dye composition in powder form comprising 20 parts of the free acid corresponding to cotton yellow G, 50 parts of disodium hydrogen phosphate, and 30 parts of calcium free sodium sulfate, said composition being characterized by ready solubility in water to form clear solutions in concentration suitable for dye bath use.

In testimony whereof I affix my signature.

HENRY WENKER.